(12) United States Patent
Krupa et al.

(10) Patent No.: US 12,234,865 B2
(45) Date of Patent: Feb. 25, 2025

(54) JOINT ASSEMBLY WITH RESTRICTION FEATURE

(71) Applicant: NEAPCO INTELLECTUAL PROPERTY HOLDINGS, LLC, Farmington, MI (US)

(72) Inventors: Kamil Krupa, Strojec (PL); Filip Duda, Praszka (PL)

(73) Assignee: NEAPCO INTELLECTUAL PROPERTY HOLDINGS, LLC, Farmington, MI (US)

( * ) Notice: Subject to any disclaimer, the term of this patent is extended or adjusted under 35 U.S.C. 154(b) by 507 days.

(21) Appl. No.: 17/606,302

(22) PCT Filed: May 15, 2020

(86) PCT No.: PCT/EP2020/063656
§ 371 (c)(1),
(2) Date: Oct. 25, 2021

(87) PCT Pub. No.: WO2020/239477
PCT Pub. Date: Dec. 3, 2020

(65) Prior Publication Data
US 2022/0213932 A1    Jul. 7, 2022

(30) Foreign Application Priority Data
May 31, 2019    (DE) .......................... 102019114654.2

(51) Int. Cl.
*F16D 3/84*    (2006.01)
*F16D 3/205*    (2006.01)
(Continued)

(52) U.S. Cl.
CPC ......... *F16D 3/2237* (2013.01); *F16D 3/2055* (2013.01); *F16D 3/845* (2013.01);
(Continued)

(58) Field of Classification Search
CPC ...... F16D 3/2237; F16D 3/2055; F16D 3/845; F16D 2003/22303; F16D 2003/22309;
(Continued)

(56) References Cited

U.S. PATENT DOCUMENTS 3,362,192 A    1/1968    Michel
6,251,019 B1    6/2001    Hofmann et al.
(Continued)

FOREIGN PATENT DOCUMENTS

DE    102005003388 A1    8/2005
ES    2116167 A1    7/1998
(Continued)

OTHER PUBLICATIONS

International Search Report and Written Opinion of International Searching Authority for PCT/EP2020/063656, ISA/NL, Rijswijk, Netherlands, Dated: Sep. 21, 2020.
(Continued)

*Primary Examiner* — Greg Binda
(74) *Attorney, Agent, or Firm* — M&B IP Analysts, LLC

(57) ABSTRACT

A joint assembly comprising a hollow outer joint member including a wall forming an open end and a closed end, the outer joint member having a plurality of tracks in its inner surface. An inner joint member received in the outer joint member and plurality of torque-transmitting elements, whereby the plurality of torque-transmitting elements rotationally engage with the inner joint member and the tracks of the outer joint member. Each track comprises two opposing side walls and a torque-transmitting element engages these side walls of the outer joint member and is configured to move in an axial direction along the side walls. Furthermore, a boot covering the open end of the outer joint member and at least one restrictor configured to engage at least one of the plurality of torque-transmitting elements to
(Continued)

Figure 1:
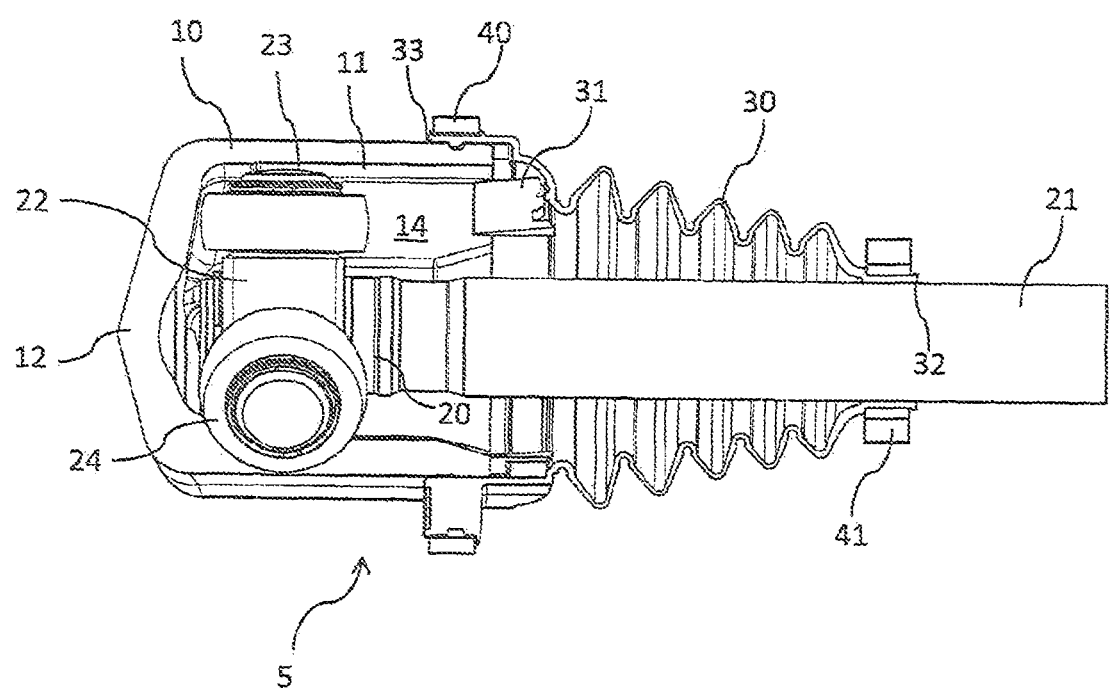

militate against undesired displacement of the inner joint member with respect to the outer joint member.

11 Claims, 12 Drawing Sheets

(51) Int. Cl.
*F16D 3/2237* (2011.01)
*F16D 3/223* (2011.01)

(52) U.S. Cl.
CPC .............. *F16D 2003/22303* (2013.01); *F16D 2003/22309* (2013.01); *F16D 2003/22316* (2013.01); *Y10S 464/905* (2013.01); *Y10S 464/906* (2013.01)

(58) Field of Classification Search
CPC ....... F16D 2003/22316; Y10S 464/905; Y10S 464/906
USPC ......................................... 464/175
See application file for complete search history.

(56) References Cited

U.S. PATENT DOCUMENTS

| | | |
|---|---|---|
| 6,390,926 B1 | 5/2002 | Perrow |
| 2012/0129616 A1* | 5/2012 | Disser ................ F16D 3/845 464/145 |
| 2017/0058960 A1 | 3/2017 | Kinsella et al. |
| 2023/0137620 A1* | 5/2023 | Escudero Hernández ................ F16D 3/2055 464/170 |

FOREIGN PATENT DOCUMENTS

| | | |
|---|---|---|
| GB | 2317436 B | 12/1998 |
| JP | H09177816 A | 7/1997 |
| JP | 2010270825 A | 12/2010 |
| JP | 2013155803 A * | 8/2013 |

OTHER PUBLICATIONS

First Office Action for application CN 202080039810.1, dated Dec. 4, 2023. China National Intellectual Property Administration, Beijing, China.

German Office Action—Request for Examination—for German Application No. DE 102019114654.2, DPMA—German Patent and Trademark Office, Munich, Germany, Dated: Dec. 28, 2021.

Second Office Action for application CN 202080039810.1, dated Jul. 24, 2024. China National Intellectual Property Administration, Beijing, China.

* cited by examiner

JOINT ASSEMBLY WITH RESTRICTION FEATURE

The present disclosure relates to joint assemblies and more particularly to an assembly for restricting undesired displacement of an inner joint member from an outer joint member.

Joint assemblies such a constant velocity joints are common components in automotive vehicles for applications requiring a transmission of rotating motion such as constant velocity motion. Constant velocity joints are typically used in front wheel drive vehicles and rear wheel drive vehicles to transmit torque from a transmission of a vehicle to the drive wheels at a constant velocity or speed. Although, in certain applications, constant velocity joints can also be used in all wheel drive and four-wheel drive vehicles.

Common types of constant velocity joints include an outer joint member and an inner joint member. The outer joint member typically includes a hollow chamber which is open at one end and closed at an opposing end, with recesses and/or tracks formed in an inner wall thereof. The inner joint member is configured to receive a drive shaft of the vehicle. In tripode joints, the inner joint member includes roller-assemblies coupled thereto. The outer joint member co-axially receives the inner joint member. The roller assemblies rotationally engage with the tracks formed in the outer member and permit angular displacement of the drive shaft and in certain scenarios, axial displacement of the inner joint member with respect to the outer joint member.

Disadvantageously, during installation, handling, maintenance, or operation of the constant velocity joint, the inner joint member may undesirably and/or unintentionally become displaced from a desired position within the outer joint member. Particularly, undesired axial displacement of the inner joint member from the outer joint member is problematic and can result in separation of the inner joint member from the outer joint member. Additionally, when undesirable axial displacement occurs, the roller assemblies and/or other components of the joint may become dislodged or damaged. To overcome this disadvantage, some constant velocity joints include an external restriction plate, a retention ring, or material staking to restrict the inner joint member from becoming undesirably displaced.

Often, these restriction features are mounted on the outer ring. For example, U.S. Patent Application No. 2017/0058960 A1 shows and describes several embodiments of restrictors that are coupled to the wall of an outer joint member and extend radially inwardly from the inner surface of the wall. The restrictors can be formed by pins, bolts or tabs, for example. In an alternative embodiment, a restrictor is a clip including legs. The clip is clamped to the open end of the outer hollow chamber. U.S. Pat. No. 6,390,926 B1 shows and describes a tripode joint with a retaining ring mounted to an inner surface of the hollow outer member. U.S. Pat. No. 6,251,019 B1 describes a constant velocity plunging joint with caulkings provided at an open end of an outer joint member. These caulkings form raised portions reducing the free inner cross-section of the outer joint member. The inner joint member and torque-transmitting elements can be introduced through the open end of the outer joint member while temporarily deforming these raised portions. Afterwards, the raised portions apply an axial holding force to the assembly consisting of the inner joint member and the torque transmitting elements.

However, known restriction features increase cost and complexity of manufacturing of the constant velocity joints. Additionally, these restriction features add complexity to maintenance or servicing of the constant velocity joint. On certain scenarios, the restriction features may become fatigued or exhibit performance degradation upon incorrect or repetitive servicing or handling thereof.

Therefore, it is the object of the present disclosure to provide a joint assembly with a restriction feature that prevents undesired displacement of an inner joint member from the outer joint member, minimizes a cost and complexity of manufacturing thereof while maximizing an ease of maintenance thereof.

A joint assembly according to the present disclosure comprises a hollow outer joint member including a wall forming an open end and a closed end, the outer joint member having a plurality of tracks in its inner surface. An inner joint member is received in the outer joint member. In particular, the inner joint member is coaxially received in the outer joint member. The joint assembly further comprises a plurality of torque-transmitting elements, the plurality of torque-transmitting elements rotationally engaging with the inner joint member and the tracks of the outer joint member. The torque-transmitting elements roll in the tracks in longitudinal direction. Thereby, each track comprises two opposing side walls running in axial direction. A torque-transmitting element engages these side walls of the outer joint member and is configured to move in an axial direction along the side walls. In particular, the torque-transmitting elements are roller assemblies with outer rollers that engage with the side walls of a track. The roller assemblies are rotationally connected to arms of the inner joint member extending radially therefrom. They can include an outer roller, an inner roller and rolling members such as rollers of a needle bearing disposed between the outer roller and the inner roller. In tripode joints like this the roller assemblies are configured to permit an axial movement and angular displacement of the inner joint member with respect to the outer joint member as the inner joint member is moved in and out of the outer joint member.

In ball-type joint assemblies, the torque-transmitting elements are balls. These balls engage with tracks in the outer joint member and tracks in the inner joint member. For ball-type joint assemblies, tracks with a semi-circular or gothic cross-section are often used. Each track also comprises two opposing side walls or sections of a wall running in axial direction. A ball engages these side walls or sections of a wall and is configured to move in an axial direction along the side walls or sections of a wall.

The joint assembly further comprises a boot covering the open end of the outer joint member. Preferably, the boot is made of an elastic material and tightly closes the open end of the hollow outer member. This way, lubricant (grease) filled into the joint cannot leave the joint and dirt cannot enter the joint. Thereby, the boot has two openings. A first opening is put over the open end of the outer joint member and a drive shaft connected to the inner joint member runs through a second opening. The boot comprises several foldings like a bellow so that it can deform when the joint assembly permits angular displacement of the drive shaft and axial displacement of the inner joint member with respect to the outer joint member.

According to the present disclosure, at least one restrictor is configured to engage at least one of the plurality of torque-transmitting elements to militate against undesired displacement of the inner joint member with respect to the outer joint member. This restrictor can also be called a restriction element or a retention element. The restrictor is part of the boot and extends through the open end of the outer joint member into a track in the outer joint member at least along a side wall of the track. Thus, the restrictor locally narrows the width of a track in the area of the open end of the outer joint member. When the inner joint member becomes displaced from a desired position within the outer joint member, a torque-transmitting element is stopped by the restrictor which restricts further axial movement of the inner joint member.

Thereby, a restrictor can easily be positioned in a track together with mounting the boot on the outer joint member. No separate element has to be mounted, temporarily deformed, etc. in order to provide a restrictor since the restrictor is part of the boot and will automatically be positioned in a track when the boot is mounted. This reduces the joint complexity and joint mass. It is an efficient and cheap solution which also enables a faster joint assembly. In addition, it improves the serviceability of the joint because for maintenance, the restrictor can easily be removed from the outer joint member together with the boot.

In particular, the present disclosure provides for restrictors that prevent effectively against undesired displacement of the inner joint member with respect to the outer joint member in all angular positions of the joint assembly. Other restrictors are known that extend into a track in the outer joint member along a base wall of a track. They can prevent displacement of the inner joint member with respect to the outer joint member as long as the inner joint member is co-axially received in the outer joint member. However, during angular displacement of the inner joint member with respect to the outer joint member these known restrictors might not fulfil the imposed requirements.

In a preferred embodiment of the present disclosure, the restrictor is made in one piece with the boot which reduces the number of components to be positioned and fixed. This provides for a simple one-piece boot design. Preferably, boot and restrictor are made of an elastic material. The elastic material of the restrictor protects the torque-transmitting element from being damaged when it contacts the restrictor. In addition, the torque-transmitting element can deform the restrictor which can be used for an additional clamping effect.

Different designs can be chosen for the restrictor. It basically is an element that projects from the boot into a track. In one embodiment of the present disclosure, the restrictor is a leaf projecting from the boot and running at least along a side wall of a track. The thickness of the leaf can vary in axial direction. In particular, its thickness decreases in a direction from the boot towards the track. Furthermore, the leaf can be bent like a shovel or paddle to adapt to the shape of the torque-transmitting element and the side wall. Thus, it can be bent towards the side wall along which it runs.

Each track of the outer joint member comprises at least one restrictor. Preferably, a restrictor is configured to be clamped between a torque-transmitting element and a side wall of a track when undesired displacement of the torque-transmitting element takes place. Position, form and material of the restrictor are chosen adequately in order to provide for this clamping effect. In one embodiment of the present disclosure, each track comprises two restrictors so that two restrictors extend into a track and run along opposite side walls of the track. With two restrictors on opposite side walls of a track it is possible not only to stop the torque-transmitting element, but also to clamp a torque-transmitting element between two restrictors. This clamping effect will occur even during angular displacement of the inner joint member with respect to the outer joint member. If the two restrictors are made of an elastic material, for example, and the two restrictors are designed and positioned adequately along opposite side walls of a track, the torque-transmitting element will deform the two restrictors so that wedged ramps are built which will continuously narrow the track width. When the torque-transmitting element rolls up these wedged ramps it finally becomes clamped between them. This effect can also be achieved with one elastic restrictor, but two elastic restrictors on opposite side walls improve the effect.

The clamping effect could also advantageously be used in order to fasten the inner joint member with respect to the outer joint member in a desired position. This can help during transport, handling and installation of the joint assembly. For handling purposes, for example, the inner joint member can be pulled out of the outer joint member until the torque-transmitting elements are pinched between the elastic restrictors. In this state, the torque-transmitting elements cannot move freely in the tracks until the inner joint member is pushed into the outer joint member with a certain force again. This state of the joint assembly can be used to avoid undesired rattling noise and/or damages to the components of the joint assembly until the joint is installed in a vehicle. For standard operation of the joint, the inner joint member is pushed into the outer joint member with a certain force so that the torque-transmitting elements can move freely in the tracks again.

Usually, the larger opening of the boot is put over the open end of the outer joint member and fixed to the outer surface of the outer joint member by means of a clamping ring, for example. Optionally, the clamping effect of the restrictors can also be used to fasten the boot to the outer joint member for storage and/or transport of the joint assembly, for example, without the need of a clamping ring or other fasteners. As described above, when the inner joint member is pulled out of the outer joint member so that the torque-transmitting elements are clamped between two restrictors in each track, the boot is fastened to the outer joint member. The friction force between the boot, the torque-transmitting element and the side wall prevents the boot from slipping off even if the boot is not fixed by an outer clamping ring. When the joint assembly is to be installed in a vehicle, the inner joint member is pushed back into the outer joint member so that the torque-transmitting elements are no longer clamped by the restrictors in the tracks. The boot can then be removed to fill the joint with lubricant, for example. The boot is then fastened to the outer joint member by permanent means like a clamping ring. Thus, the present disclosure cannot only be used to restrict axial displacement of an inner joint member with respect to an outer joint member. It can also be used to temporarily fasten a boot to the outer member.

In one embodiment of the present disclosure, the restrictor is in contact with a side wall of a track after the boot has been mounted to the outer joint member. If a leaf is chosen, its form can be adapted to the inner surface of the respective side wall so that the leaf fits tightly with the side wall. In some embodiments, when the torque-transmitting element gets into contact with the elastic restrictor, the restrictor is pressed against the side wall and is deformed and compressed by the torque-transmitting element.

However, the restrictor does not have to be in contact with a side wall of a track after the boot has been mounted to the outer joint member. Thus, in another embodiment of the present disclosure, the restrictor is arranged in a distance to a side wall of a track. It is spaced apart from a side wall along which it runs. In this position, the restrictor can stop axial movement of a torque-transmitting element. If design and position of the restrictor are chosen adequately, it will still be deformed and compressed by a torque-transmitting element in such a way that the restrictor is pushed between the torque-transmitting element and the side wall of the track. Once it is squeezed into the space between the torque-transmitting element and the side wall of the track, the deformation of the restrictor will form a wedged ramp. A distance between a restrictor and a side wall along which it runs can exist due to the fact that the restrictors are inserted into the outer hollow joint member with clearance in order to allow for easy assembly. However, even with greater clearance than required for easy assembly, the present disclosure would still work.

The clamping effect can also be achieved or even further be improved if a surface of a restrictor contacting a torque-transmitting element is inclined to form a wedge angle. Then a restrictor acts as a wedge. Therefore, in one embodiment of the present disclosure, a surface of a restrictor in the area of a first side wall points to the opposite side wall of a track, and said surface runs at an angle $\alpha$ to the first side wall, wherein the angle $\alpha$ opens to the open end of the outer joint member. An inclined surface under an angle $\alpha$ can be achieved by a restrictor with decreasing thickness in axial direction towards the torque-transmitting elements, for example. Preferably, this angle $\alpha$ is between 0 and 35°, particularly between 0 and 20°, more particularly between 0 and 10°. In this range of angles, the axial force of the moving torque-transmitting element at the contact point between restrictor and torque-transmitting element will generate a force in the direction of a side wall that will cause the elastic restrictor to be compressed in radial direction. With higher angles, the torque-transmitting element will only be stopped, but the ramp is too steep for the torque-transmitting element to roll onto the ramp. Of course, material, form and thickness of the restrictor also have to be chosen adequately.

In order to provide restrictors in the boot that can provide the above-mentioned functions, a restrictor projecting from the boot can be supported by stiffeners at the foot of the restrictor, for example.

Furthermore, a restrictor extending into a track of the outer joint member can also be formed by an elongated element running from one side wall to an opposite side wall of a track, wherein this element runs along the outer edges of the two side walls and a base wall of the track. Thereby, it not only extends into the track in the area of the side walls, it also extends into the track in the area of the base wall. The restrictor then has a U-shaped or arc shaped cross-section. Further, a restrictor can run from one side wall along the open end of the outer joint member to a base wall of a track. The restrictor will then have an arc shaped cross-section covering about 90°.

Figure 2:
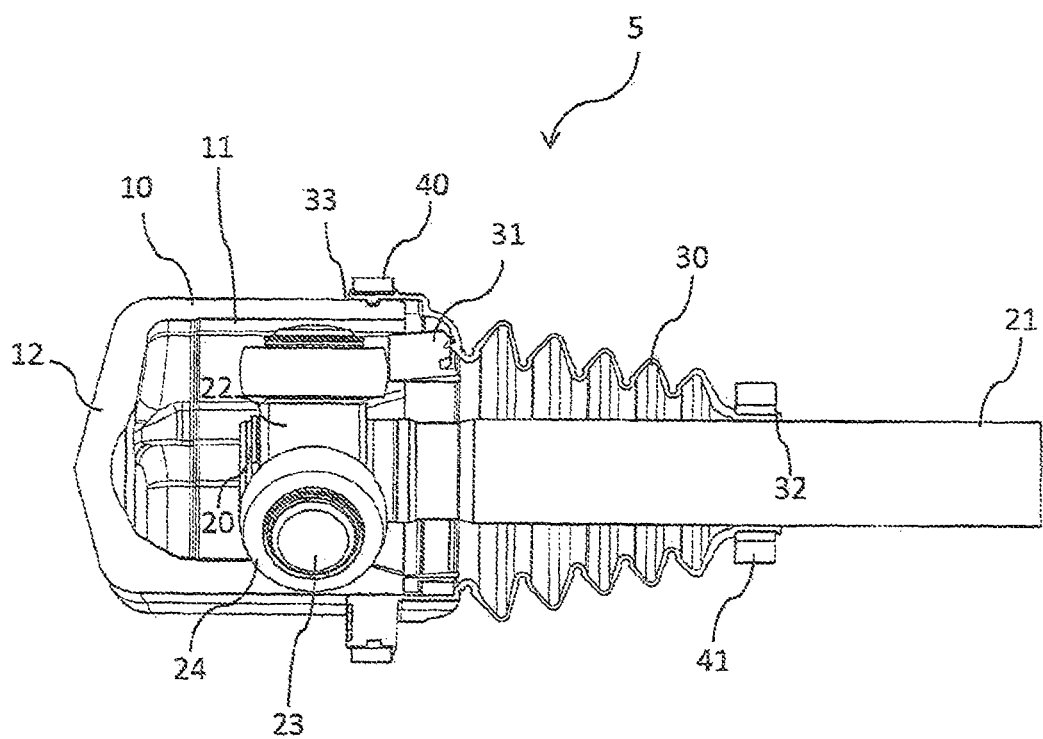
Figure 3:
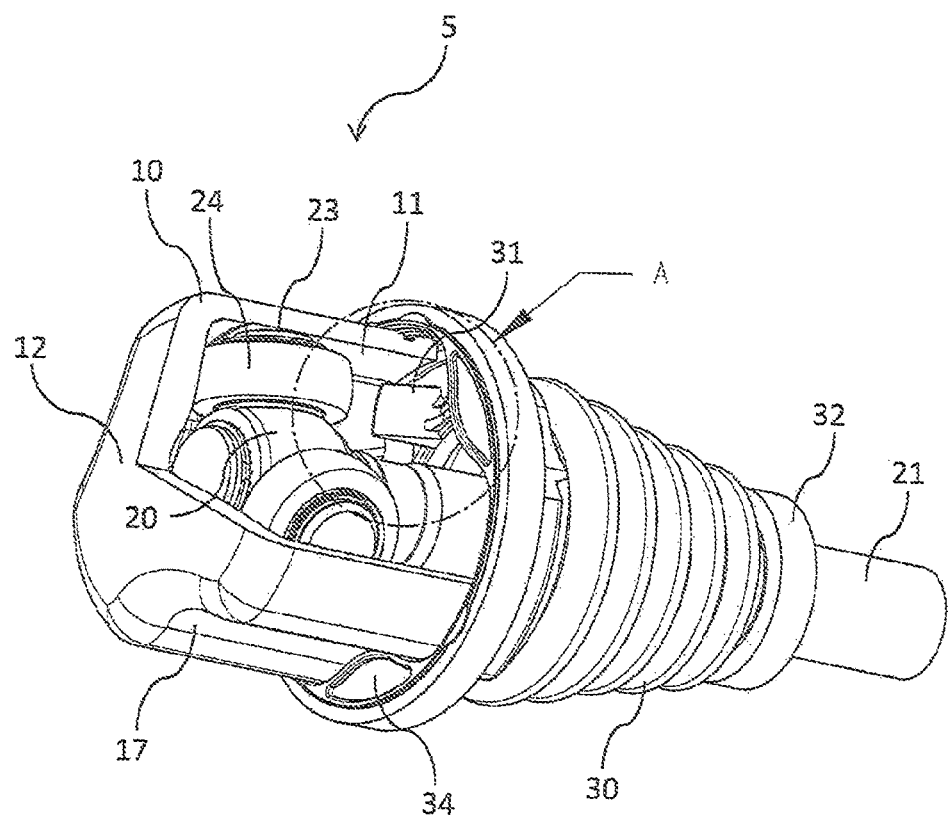
Figure 4:
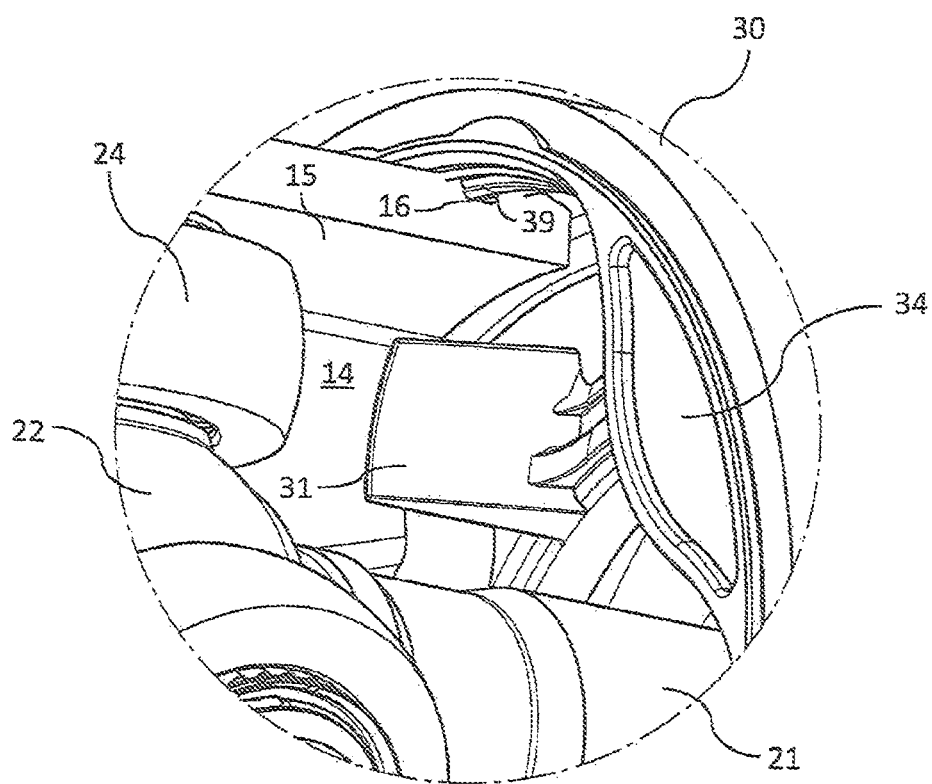
Figure 5:
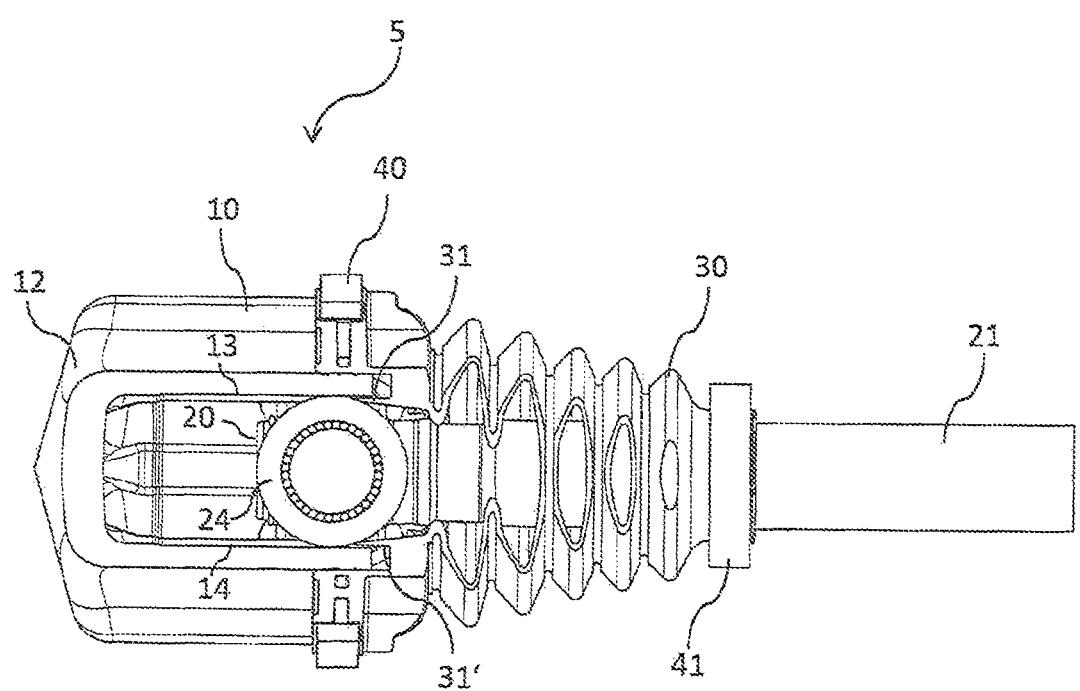
Figure 6:
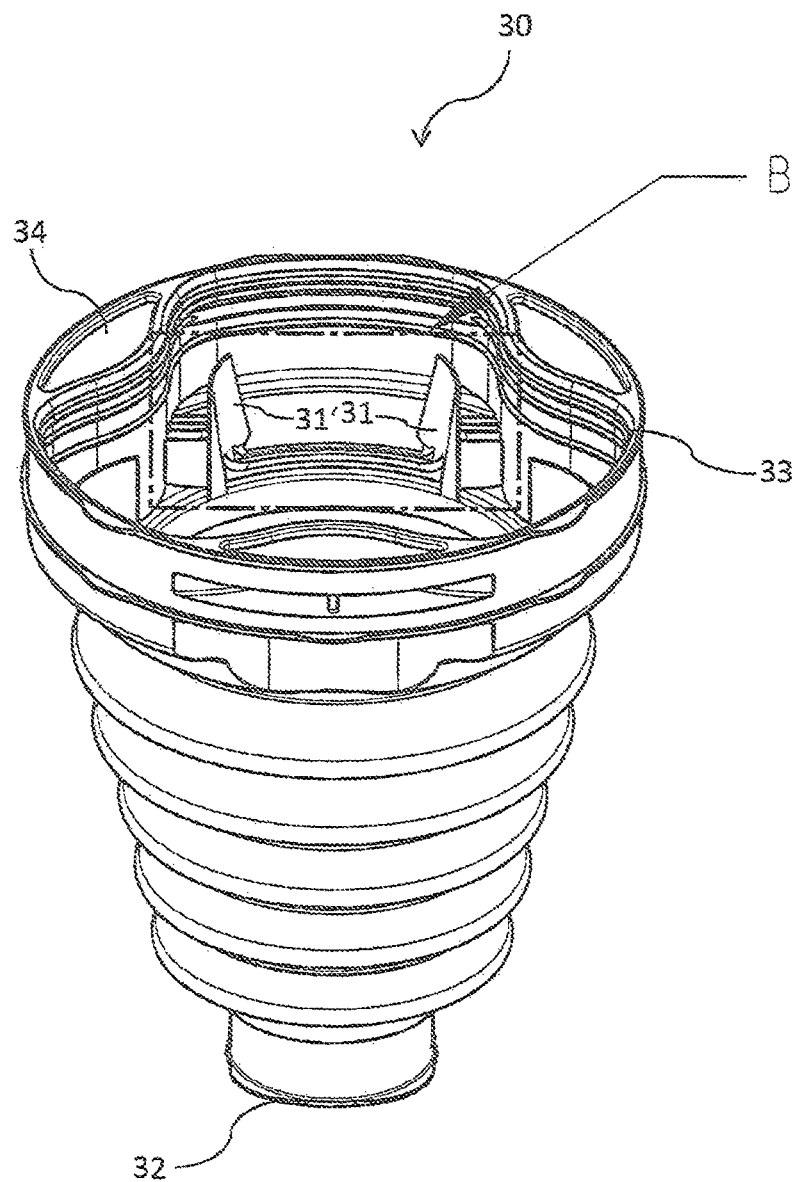
Figure 7:
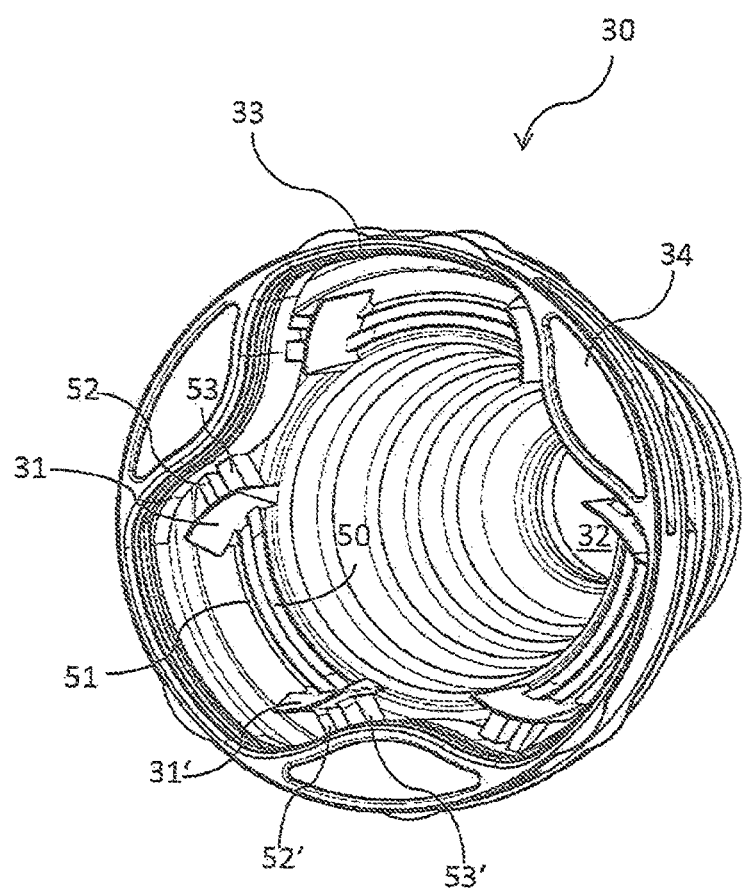
Figure 8:
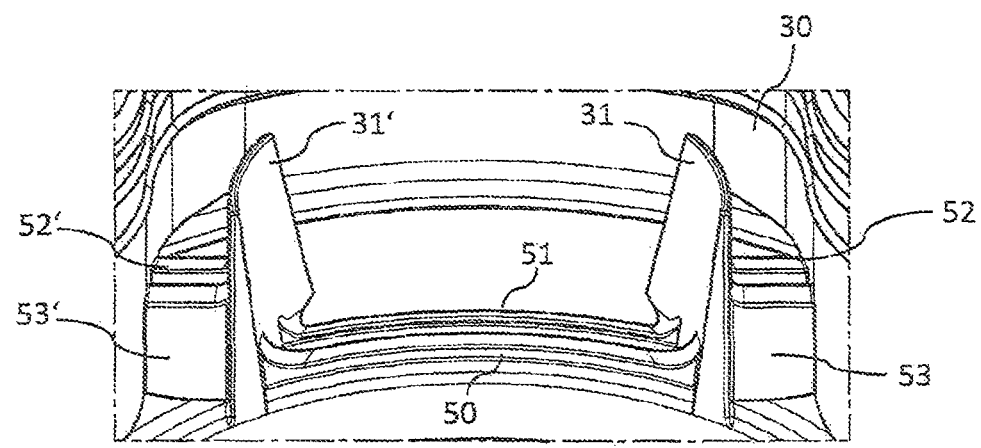
Figure 9:
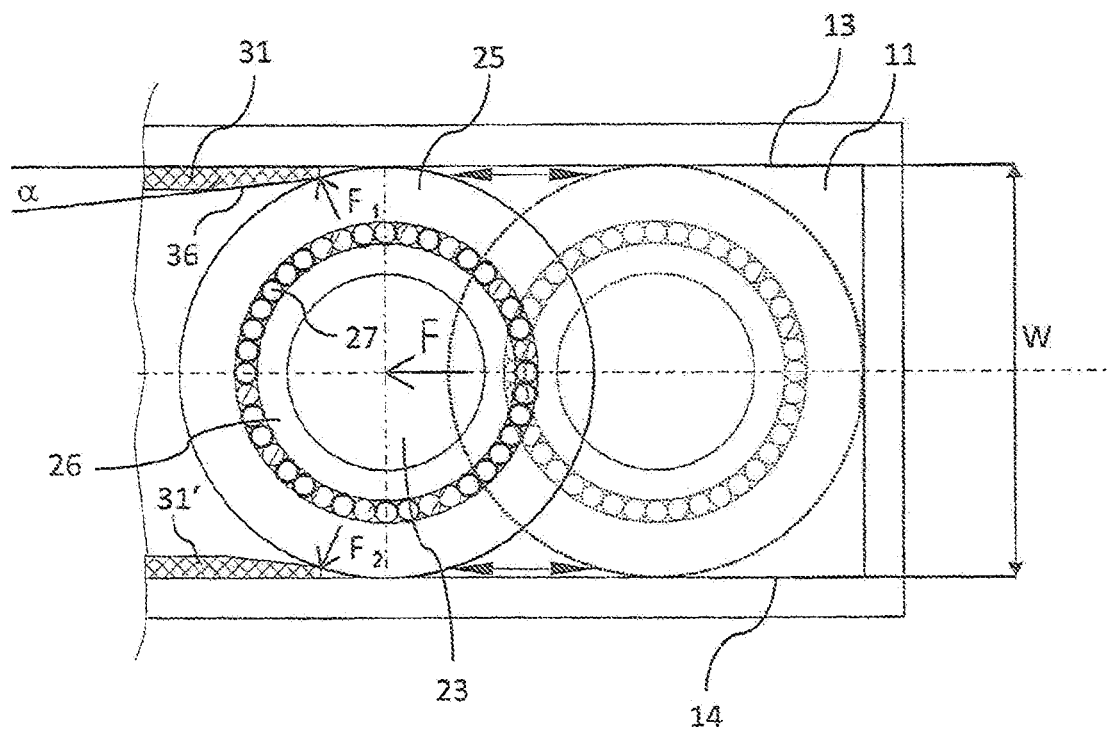
Figure 10:
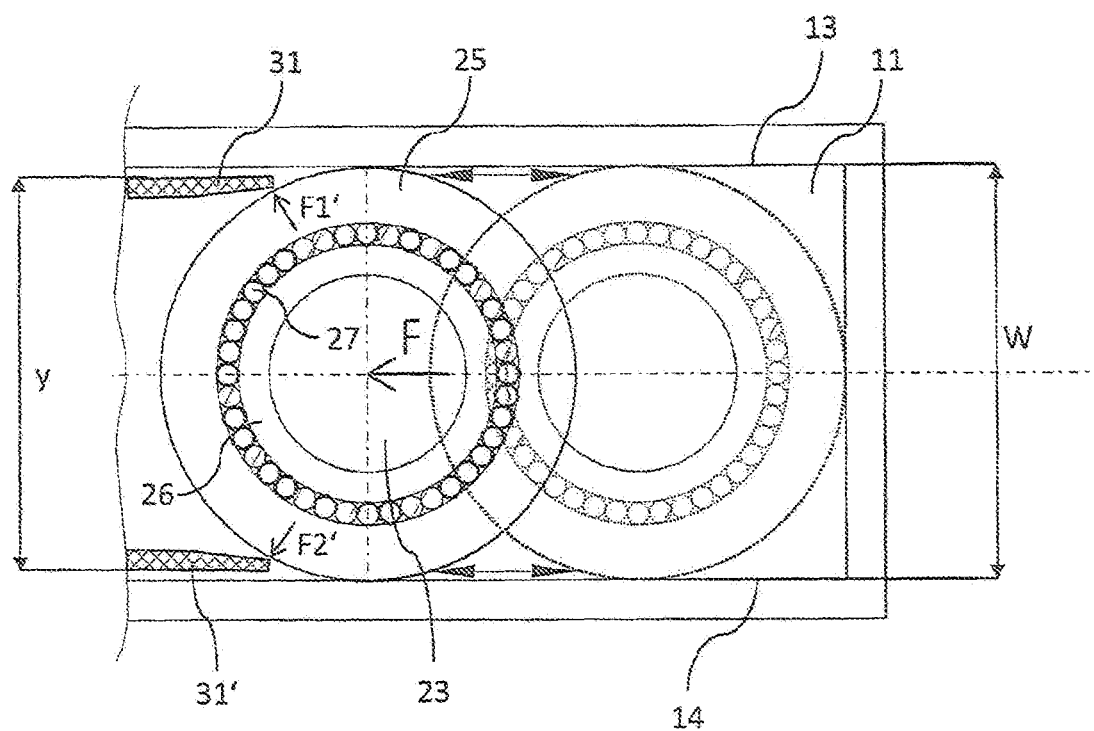
Figure 11:
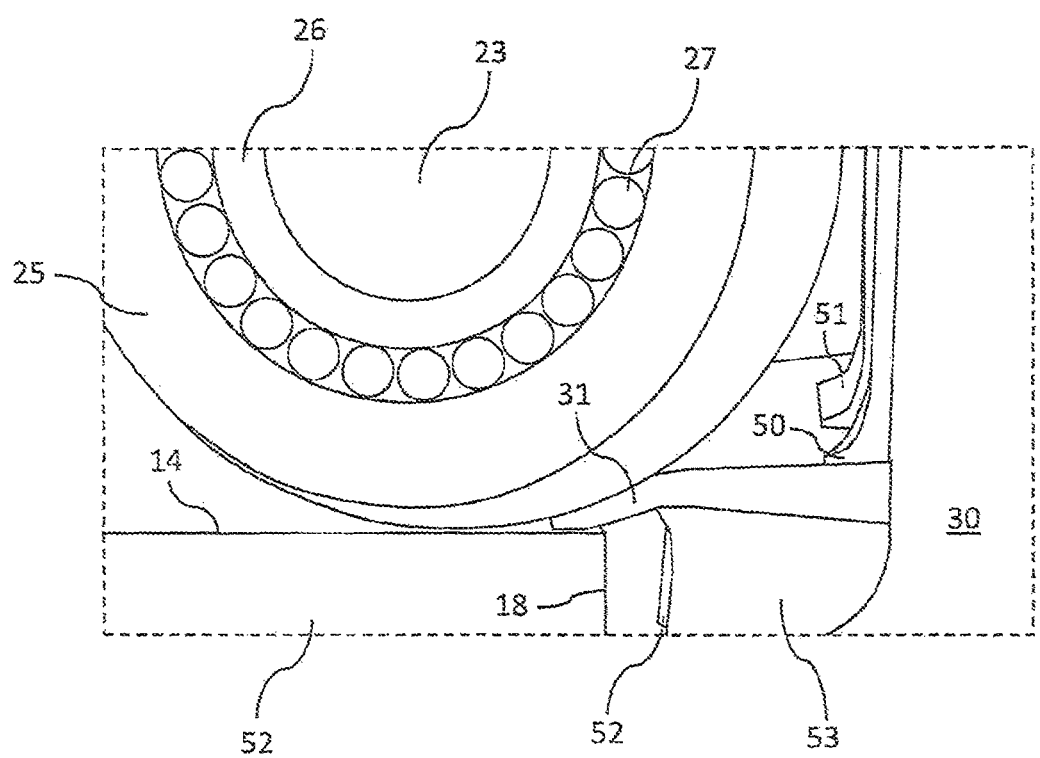
Figure 12:
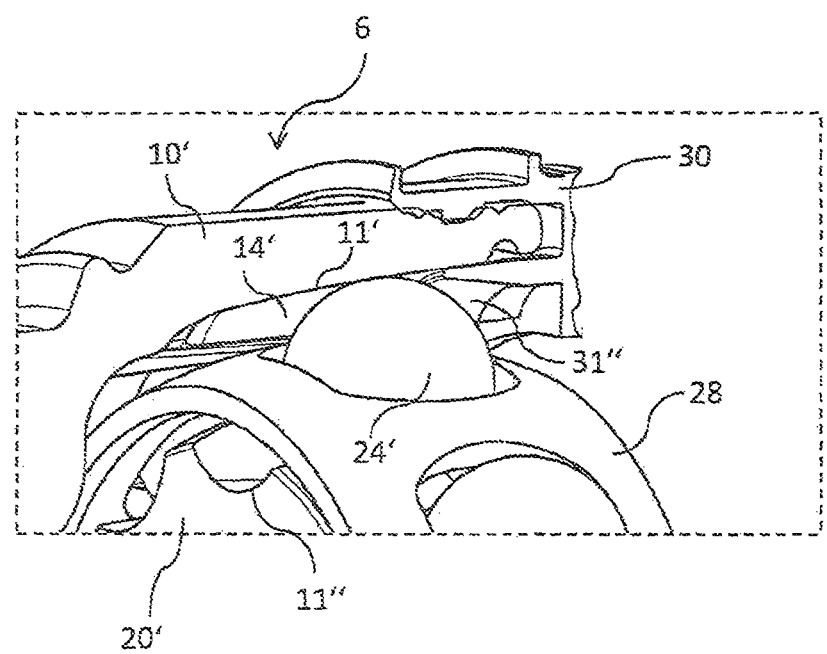

The various embodiments will be explained in greater detail below based on the attached figures. These must be viewed only as examples, and are not intended to limit the disclosed embodiments to the depicted embodiments. Shown on:

FIG. 1: a first longitudinal section through an embodiment of a joint assembly with an inner joint member in a moving position;

FIG. 2: the joint assembly of FIG. 1 with the inner joint member in an almost blocked position;

FIG. 3: a partial insight into the joint assembly of FIG. 1;

FIG. 4: an enlarged view A of the partial insight of FIG. 3;

FIG. 5: a second longitudinal section through the joint assembly of FIG. 1 with the inner joint member in a blocked position;

FIG. 6: a three-dimensional view of a boot for use in the embodiment;

FIG. 7: another three-dimensional view of the boot of FIG. 6;

FIG. 8: an enlarged view B of the boot of FIG. 6;

FIG. 9: a schematic illustration of a roller assembly in a moving position and in a position contacting two restrictors with restrictors adjacent to the side walls;

FIG. 10: a schematic illustration of a roller assembly in a moving position and in a position contacting two restrictors with restrictors spaced apart from the side walls;

FIG. 11: an enlarged view of a roller assembly deforming and displacing the leaf of a boot; and FIG. 12: an enlarged extracted view of a ball-type joint assembly.

The following detailed description and appended drawings describe and illustrate various exemplary embodiments of the disclosed embodiments. The description and drawings serve to enable one skilled in the art to make and use the disclosed embodiments, and are not intended to limit the scope of the disclosed embodiments in any manner. In respect of methods disclosed, the steps presented are exemplary in nature, and thus, the order of the steps is not necessary or critical.

The present technology relates to joint assemblies, such as constant velocity joints, used in motor vehicles. However, the present disclosure can apply to other types of joint assemblies used in motor vehicles or in other applications. Joint assemblies according to the disclosure are configured to facilitate a transmission of rotational forces and torque to components of a motor vehicle such as the wheels, for example.

FIGS. 1-11 show a joint assembly 5 according to an embodiment of the present disclosure. The joint assembly includes an inner joint member 20 and an outer joint member 10. The joint assembly is configured as a tripode-type constant velocity joint. However, in other embodiments, the joint assembly can be configured as a ball-type constant velocity joint. It is understood that the joint assembly can be configured as a constant velocity joint or joint assembly of any type having an inner joint member and an outer joint member, as desired. FIG. 12 shows an enlarged view of an exemplary ball-type joint assembly.

As illustrated, the inner joint member 20 of the joint assembly 5 is configured as a tripode joint including three arms 23 extending radially outwardly from the inner joint member 20. The inner joint member 20 is configured to be splined with a drive shaft 21 of the vehicle. For example, a central bore is splined and receives a splined drive shaft 21. The inner joint member 20 includes a spider 22 with three arms extending radially therefrom, whereas one arm is identified with the reference numeral 23. Each of the arms 23 includes a roller assembly engaging a distal end thereof, whereas one roller assembly is identified with the reference numeral 24.

Each roller assembly 24 includes an outer roller 25, an inner roller 26, and rolling members 27 such as rollers of a needle bearing disposed between the outer roller and the inner roller (e.g. FIG. 9). The roller assembly 24 can include retainers maintaining the rolling members 27 disposed between the inner roller 26 and the outer roller 25. The roller assembly 24 is configured to permit an axial movement and angular displacement of the inner joint member 20 with respect to the outer joint member 10 as the inner joint member 20 is moved in and out of the outer joint member 10.

The outer joint member 10 is configured as a hollow chamber having a closed end 12, an open end on the opposite side, and an annular array of recesses or tracks 11 on an inner surface of a wall forming the chamber. The outer joint member 10 has a substantially tri-lobal cross-sectional shape. The tracks 11 include a pair of longitudinally extending opposing side walls 13 and 14. Each of the tracks 11 receives one of the roller assemblies 24 of the inner joint member 20, wherein the outer roller 25 of each of the roller assemblies 24 engages the side walls 13,14 of the outer joint member 11.

A boot 30 is mounted to the open end of the outer joint member 10. The boot 30 is made of an elastic material and comprises several foldings like a bellow. The boot 30 comprises a smaller opening 32 and a larger opening 33. The drive shaft 21 runs through the smaller opening 32 and is tightly fixed to the drive shaft by means of a clamping ring 41, for example. The larger opening 33 is put over the open end of the outer joint member 10 and is tightly fixed to the outer surface of the outer joint member 10 by means of a second clamping ring 40. In addition, there is at least one circular groove 16 on the outer surface of the outer joint member 10 in the area of the open end (see FIG. 4). A circular tongue 35 on the inner surface of the boot 30 in the area of the larger opening 33 engages this groove 16.

Furthermore, the boot 30 comprises three bulges 34 in the area of the larger opening 33. These bulges 34 fit into corresponding recesses on the outer surface of the outer joint member 10 so that the boot 30 can tightly be fixed to the outer joint member 10 by means of a clamping ring 40. These recesses are due to the tri-lobal form of the outer joint member 10. Such outer joint member is also called tulip.

The boot 30 comprises several restrictors that extend into the three tracks 11 of the outer joint member 10. Each track comprises two restrictors in form of leaves that project from the boot 30 into the tracks 11. For example, the sections in FIGS. 1 to 4 show one restrictor 31 along a side wall 14 in a track 11, whereas the section of FIG. 5 shows two restrictors 31 and 31' along two opposing side walls 13 and 14. FIGS. 1, 3 and 4 show the inner joint member 20 with the roller assemblies 24 in a moving position. FIG. 2 shows the inner joint member 20 with the roller assemblies 24 almost in a blocked position when they start to have contact to the restrictors 31, 31'. In the situation of FIG. 5, the roller assembly 24 is blocked by the restrictors 31, 31'.

FIGS. 6 and 7 show these restrictors 31, 31' on the boot 30 in more detail. They have the form of leaves that project from the boot 30. Thereby, the foot of the restrictors has a greater thickness than the free end of the restrictors so that they are wedge-shaped. Their thickness decreases in axial direction towards the torque-transmitting elements. In addition, there are two stiffeners 50 and 51 between the two restrictors 31, 31' that merge into the restrictors 31, 31' with a radius. The restrictors 31, 31' are supported against the bulges 34 by means of additional stiffeners 52, 53 and 52', 53'. All stiffeners are formed by protruding walls FIG. 9 schematically shows a first embodiment of restrictors 31 and 31' that extend from a boot (not shown) into a track 11 with two opposing side walls 13 and 14. The restrictors 31, 31' narrow the width W of the track in the area of the open end of the outer joint member. A roller assembly has an inner roller 26 fixed to an arm 23 of the inner joint member. An outer joint member 25 is rotatably held on the inner roller 26 by means of roller members 27. FIG. 9 shows this roller assembly in two positions. A first position is illustrated by dotted lines, whereas a second position is illustrated by continuous lines. The travel between these positions is indicated by double arrows. In the first position, the roller assembly can freely move along the track 11. In the second position, the roller assembly has contacted the restrictors 31, 31' so that its free travel towards the open end of the outer joint member is prevented.

The restrictors 31, 31' extend along the side walls 13, 14 whereby they have contact with the surfaces of the side walls. This contact can be a loose contact or the restrictors 31, 31' are pressed into the track 11. Preferably, the restrictors are made of an elastic material. If the inner joint member with the roller assembly moves further into the direction of the open end of the outer joint member (to the left), the outer roller 25 will deform and compress the restrictors 31, 31'. Then the roller assembly will be clamped between the two compressed restrictors 31, 31'. Thereby, an axial force F is used to generate forces $F_1$ and $F_2$ onto the restrictors 31, 31' in the direction of the side walls. Form and size of the restrictors 31, 31' are chosen adequately in order to achieve this deformation and compression. For example, the restrictors 31, 31' should not be too thick at a contact point between restrictor and the outer roller of a roller assembly. In addition, an inclined surface 36 can help to form a wedge angle α. Angle α preferably is in the range between 0 and 35°, particularly between 0 and 20°, more particularly between 0 and 10°. The inclined surface 36 is a surface that contacts the roller assembly and provides for a ramp.

FIG. 10 shows another embodiment in a schematic illustration similar to FIG. 9. The restrictors 31, 31' used in this embodiment do not have contact with the side walls 13 and 14. They are spaced apart from the side walls. Each restrictor 31, 31' has a surface pointing in the direction of a side wall 13, 14 along which it runs. The distance y between these surfaces is smaller than the width W of the track 11. Even in this configuration, the restrictors 31, 31' will not only stop the travel of the roller assembly in axial direction. When the outer roller of the roller assembly contacts the restrictors, the axial force F generates forces $F_1$ and $F_2$ onto the restrictors 31, 31' in the direction of the side walls. The restrictors will bend and will be pressed between the outer roller 25 and each side wall. In this position, a wedge will be formed that clamps the roller assembly between the two restrictors.

Optionally, this clamping effect could even be used if the boot 30 is not tightly fastened to the outer hollow joint member yet. When the roller assembly contacts the restrictors, the boot might be pushed away from the outer joint member a little bit. However, as soon as the restrictors are deformed and clamped between the outer rollers and the side walls, the boot can no longer move. FIG. 11 shows an enlarged view of this situation. A leaf 31 projects from a boot 30 into a track along a side wall 14. Thereby, the boot 30 maybe has had contact to an outer edge 18 of the open end of the outer joint member, but in FIG. 11, the outer roller 25 has already pushed the boot 30 away from the edge 18 together with the restrictor 31. However, at the same time the restrictor 31 has been deformed and pressed into the space between outer roller 25 and side wall 14. Several stiffeners 50, 51, 52 and 53 on both sides of the restrictor 31 can help to keep the restrictor 31 in place. Another restrictor on the opposing side wall (not shown) has experienced the same. Therefore, the roller assembly is clamped between the two deformed restrictors. Now the boot 30 cannot be removed from the outer joint member 10 due to the friction forces between restrictor 31, side wall 14 and outer roller 25.

FIG. 12 shows an enlarged extracted view of another embodiment which is used to illustrate a restrictor according to an embodiment in a ball-type joint assembly 6 with an inner joint member 20' and an outer joint member 10'. The torque-transmitting elements are balls. These balls 24' engage with tracks 11' in the outer joint member 10' and tracks 11" in the inner joint member 20' and are typically held in openings within a cage 28. For ball-type joint assemblies, tracks with a semi-circular or gothic cross-section are often used. Each track also comprises two opposing side walls or sections of a wall running in axial direction. A ball engages these side walls or sections of a wall and is configured to move in an axial direction along the side walls or sections of a wall. For example, the enlarged extracted view of FIG. 11 shows that the ball 24' engages the side wall 14' in the track 11' in the outer joint member 10'. A boot 30 comprises at least one restrictor 31" that extends into the track 11' along a side wall 14'. The boot 30 can comprise at least one restrictor 31", in particular two restrictors, for each track. Thereby, the form of the restrictor 31" is adapted to the shape of the track 11'.

What is claimed is:

1. A joint assembly comprising:
   a hollow outer joint member including a wall forming an open end and a closed end, the outer joint member having a plurality of tracks in its inner surface;
   an inner joint member received in the outer joint member;
   a plurality of torque-transmitting elements, the plurality of torque-transmitting elements rotationally engaging with the inner joint member and the plurality of tracks of the outer joint member, wherein each track comprises two opposing side walls and the plurality of torque-transmitting elements engage these side walls of the outer joint member and is configured to move in an axial direction along the side walls;
   a boot covering the open end of the outer joint member;
   a plurality of restrictors, at least one of the restrictors being configured to engage at least one of the plurality of torque-transmitting elements to militate against undesired displacement of the inner joint member with respect to the outer joint member, and
   at least one stiffener merged into and integrally formed with the at least one of the restrictors;
   wherein the at least one of the restrictors is part of the boot and extends through the open end of the outer joint member into the at least one of the plurality of tracks in the outer joint member along one of the side walls, and a surface of the restrictor in an area of a first side wall points to the opposite side wall of the at least one of the tracks, and said surface runs at an angle α to the first side wall, wherein the angle α opens to the open end of the outer joint member, wherein the angle α is between 0 and 35°;
   wherein the at least one of the restrictors and the at least one stiffener are made in one piece with the boot; and
   wherein the at least one of the restrictors and at least another one of the plurality of restrictors extend into each of the tracks and run along both side walls and a base wall of the track.

2. The joint assembly according to claim 1, wherein at least one of the restrictors is a leaf.

3. The joint assembly according to claim 1, wherein at least one of the restrictors is in contact with one of the side walls of one of the tracks.

4. The joint assembly according to claim 1, wherein at least one of the restrictors is arranged at a distance to one of the side walls of one of the tracks.

5. The joint assembly according to claim 1, wherein at least one of the restrictors is made of an elastic material.

6. The joint assembly according to claim 1, wherein the plurality of torque-transmitting elements are roller assemblies or balls that engage with the side walls of one of the tracks.

7. The joint assembly according to claim 1, wherein the angle α is between 0 and 20°.

8. The joint assembly according to claim 1, wherein the angle α is between 0 and 10°.

9. The joint assembly according to claim 1, wherein the at least one stiffener is made of an elastic material.

10. The joint assembly according to claim 1, wherein the at least another one of the plurality of restrictors is associated with at least one other stiffener, and wherein the at least one of the restrictors, the at least another one of the restrictors, the at least one stiffener and the at least one other stiffener are connected to form a U shape.

11. The joint assembly according to claim 10, further comprising two additional stiffeners, each of the two additional stiffeners being connected to a respective one of the at least one of the restrictors and the at least another one of the plurality of restrictors and being located external to the U shape.

* * * * *